United States Patent
Schneider

(10) Patent No.: US 10,922,593 B2
(45) Date of Patent: Feb. 16, 2021

(54) METHOD AND CONTROLLER FOR PRINTING A TEST IMAGE, AND CORRESPONDING TEST IMAGE

(71) Applicant: Canon Production Printing Holding B.V., Venlo (NL)

(72) Inventor: Claus Schneider, Eching (DE)

(73) Assignee: Canon Production Printing Holding B.V., Venlo (NL)

( * ) Notice: Subject to any disclaimer, the term of this patent is extended or adjusted under 35 U.S.C. 154(b) by 0 days.

(21) Appl. No.: 16/750,302

(22) Filed: Jan. 23, 2020

(65) Prior Publication Data

US 2020/0242432 A1 Jul. 30, 2020

(30) Foreign Application Priority Data

Jan. 24, 2019 (DE) .......................... 10 2019 101 687

(51) Int. Cl.
*G06K 15/02* (2006.01)
*G06K 15/10* (2006.01)

(52) U.S. Cl.
CPC ....... *G06K 15/1894* (2013.01); *G06K 15/027* (2013.01); *G06K 15/102* (2013.01)

(58) Field of Classification Search
CPC . G06K 15/1894; G06K 15/102; G06K 15/027
USPC .......................................................... 358/1.8
See application file for complete search history.

(56) References Cited

U.S. PATENT DOCUMENTS

2011/0234676 A1 9/2011 Nishikawa

FOREIGN PATENT DOCUMENTS

EP 2722188 A1 4/2014

OTHER PUBLICATIONS

German Office Action dated Oct. 21, 2019, Application No. 10 2019 101 687.8.

*Primary Examiner* — Tammy Paige Goddard
*Assistant Examiner* — Darryl V Dottin
(74) *Attorney, Agent, or Firm* — Schiff Hardin LLP

(57) ABSTRACT

A test image having a plurality of line rows is printed. The individual lines of the line rows are printed by different nozzles of a print head. The lines are thereby associated with the different line rows such that the lines of two directly adjacent line rows are not printed by all respective nozzles from two nozzle rows of the print head that are connected with one another via a common ink supply channel. Cross-talk between the nozzle rows, and print image artifacts of the test image that are linked therewith, may thus be advantageously avoided.

16 Claims, 2 Drawing Sheets

METHOD AND CONTROLLER FOR PRINTING A TEST IMAGE, AND CORRESPONDING TEST IMAGE

CROSS REFERENCE TO RELATED APPLICATIONS

This patent application claims priority to German Patent Application No. 102019101687.8, filed Jan. 24, 2019, which is incorporated herein by reference in its entirety.

BACKGROUND

Field

The disclosure relates to an inkjet printer. In particular, the disclosure relates to a method and a corresponding controller with which a test image maybe detected to detect a nozzle failure of a nozzle of an inkjet printer. Furthermore, the disclosure relates to a test image to detect a nozzle failure.

Related Art

An inkjet printer for printing to a recording medium may include one or more print heads having respectively one or more nozzles. The nozzles are respectively configured to eject ink droplets in order to print dots of a print image onto the recording medium. The one or more print heads and a recording medium are thereby moved relative to one another in order to print dots at different positions, in particular in different lines, on the recording medium.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
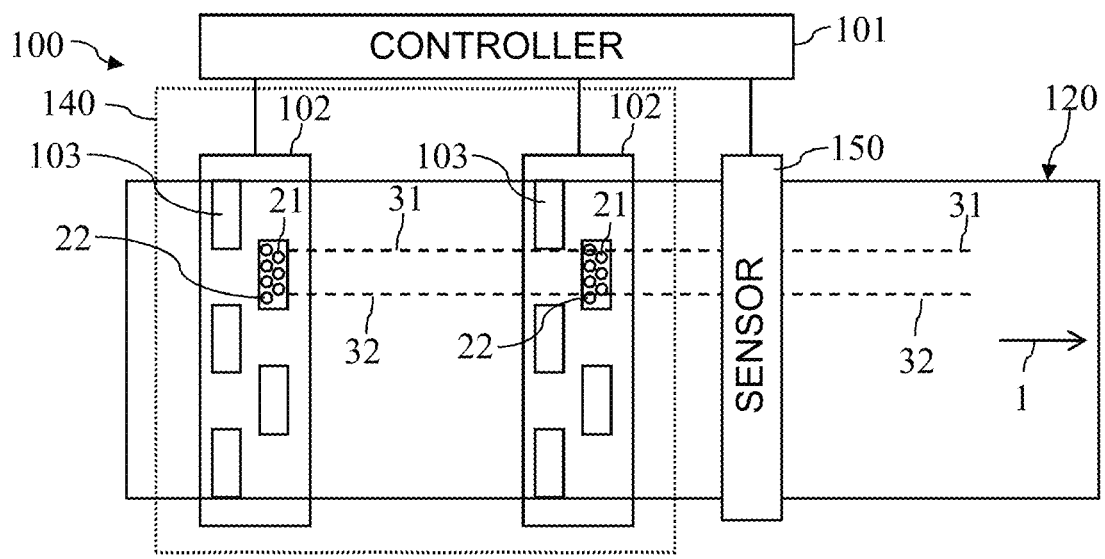
FIG. 1 illustrates an inkjet printer according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

Nozzle failures may occur during the operation of an inkjet printer, whereby the print quality of the printer is negatively affected. An object of the present disclosure is to reliably and efficiently detect nozzle failures. In an exemplary aspect, a test image can be printed that enables nozzle failures to be reliably and efficiently detected, including to be able to take early measures to compensate for nozzle failures.

According to one aspect of the disclosure, a method is described for printing a test image to check nozzles of a print head, wherein the print head includes Q nozzles that are arranged in L different nozzle rows, with L>2 and with Q>5. The nozzles of at least one sub-group of two or more nozzle rows are thereby supplied with ink via a common supply channel of the print head.

In an exemplary embodiment, the method includes the production of a relative motion along a transport direction between the print head and a recording medium. Moreover, the method includes the controlling of the nozzles of the print head in order to print a test image onto the recording medium during the relative motion so that the test image includes R line rows with respectively two or more lines, with R>1, and so that the test image includes at least Q lines for the Q nozzles. Furthermore, the nozzles are controlled such that two directly adjacent line rows are not printed in immediate succession by all respective nozzles of two nozzle rows of the same sub-group of nozzle rows.

In an exemplary embodiment, a controller for an inkjet printer is provided. The printer can include at least one print head having Q nozzles that are arranged in L different nozzle rows, with L>2 and with Q>5. The nozzles of at least one sub-group of two or more nozzle rows are thereby supplied with ink via a common, internal supply channel of the print head.

In an exemplary embodiment, the controller is configured to produce a relative motion along a transport direction between the print head and a recording medium. Moreover, the controller is configured to control the nozzles of the print head in order to print a test image onto the recording medium during the relative motion, so that the test image includes R line rows with respectively two or more lines, with R>1, and so that the test image includes at least Q lines for the Q nozzles. In an exemplary embodiment, the controller is configured to control the nozzles such that two directly adjacent lines rows are not printed in immediate succession by all respective nozzles of two nozzle rows of the same sub-group of nozzle rows.

In an exemplary embodiment, a test image for checking nozzles of a print head is described, wherein the print head to be checked includes Q nozzles that are arranged in L different nozzle rows, with L>2 and with Q>5. The Q nozzles are thereby configured to print dots in a corresponding Q columns of the test image in a one-to-one relation.

In an exemplary embodiment, the test image includes R line rows with respectively two or more lines, with R>1, as well as at least or precisely Q lines for the Q nozzles. The Q lines are thereby arranged in the R line rows, or distributed among the R line rows, such that a first line row of the test image does not include lines for all nozzles of a first nozzle row, and an immediately adjacent second line row of the test image does not include lines for all nozzles of a second nozzle row, and in fact does not include lines for nozzle rows that are connected with one another via a common internal supply channel of the print head.

FIG. 1 illustrates printer 100 according to an exemplary embodiment. The printer 100 can be configured to print to a recording medium 120 in the form of a sheet or page or plate or belt. The recording medium 120 may be produced from paper, paperboard, cardboard, metal, plastic, textiles, a combination thereof, and/or other materials that are suitable and can be printed to. The recording medium 120 is directed through the print group 140 of the printer 100 along the transport direction 1, which is represented by an arrow.

In the presented example, the print group 140 of the printer 100 includes two print bars 102, wherein each print bar 102 may be used for printing with ink of a defined color, for example black, cyan, magenta, and/or yellow, and if applicable MICR ink. Different print bars 102 may be used for printing with respective different inks. Moreover, the printer 100 may include a sensor 150 that is configured to detect sensor data with regard to a print image printed onto the recording medium 120, in particular with regard to the test image described in this document. Furthermore, the printer 100 typically includes at least one fixing or dryer that is configured to fix a print image printed onto the recording medium 120.

In an exemplary embodiment, a print bar 102 may include one or more print heads 103 that are arranged next to one another in multiple rows in order to print the dots of different columns 31, 32 of a print image onto the recording medium 120. In the example depicted in FIG. 1, a print bar 102 includes five print heads 103, wherein each print head 103 prints a group of columns 31, 32 of a print head onto the recording medium 120. The number of print heads 103 of a print bar 102 may be 5, 10, or more, for example.

In the embodiment depicted in FIG. 1, each print head 103 of the print group 140 includes a plurality of nozzles 21, 22, wherein each nozzle 21, 22 is configured to fire or eject ink droplets onto the recording medium 120. For example, a print head 103 of the print group 140 may include multiple thousands of effectively utilized nozzles 21, 22 that are arranged along a plurality of row transversal to the transport direction 1 of the recording medium 120. By means of the nozzles 21, 22 of a print head 103 of the print group 140, dots of a line of a print image may be printed onto the recording medium 120 transversal to the transport direction 1, meaning along the width of the recording medium 120.

In an exemplary embodiment, the printer 100 also includes a controller 101 (e.g. an activation hardware and/or a processor) that is configured to control the actuators of the individual nozzles 21, 22 of the individual print heads 103 of the print group 140 in order to apply the print image onto the recording medium 120 depending on print data. In an exemplary embodiment, the controller 101 includes processor circuitry that is configured to perform one or more functions and/or operations of the controller, including controlling the actuators of the individual nozzles 21, 22 and/or controlling the overall operation of the printer 101.

In an exemplary embodiment, the print group 140 of the printer 100 includes at least one print bar 102 having K nozzles 21, 22, where the nozzles 21, 22 may be arranged in one or more print heads 103, and where the nozzles 21, 22 may be activated with a defined line clock or with a defined activation frequency in order to print a line traveling transversal to the transport direction 1 of the recording medium 120, with K pixels or K columns 31, 32 of a print image onto the recording medium 120, for example with K>1000. In the depicted example, the nozzles 21, 22 are installed immovably or permanently in the printer 120, and the recording medium 120 is directed past the stationary nozzles 21, 22 with a defined transport velocity.

Figure 2:
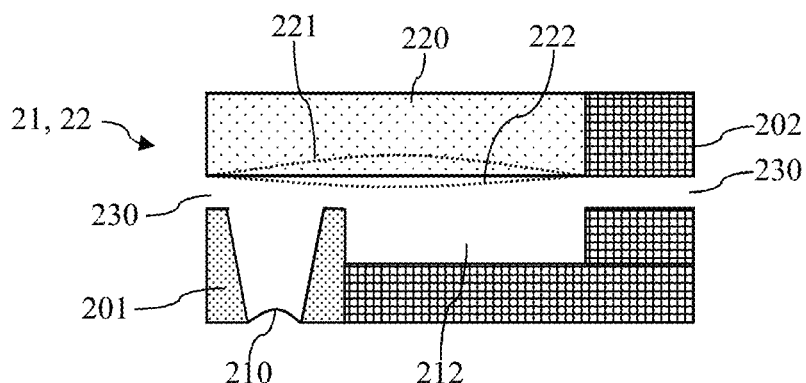
FIG. 2 is a nozzle according to an exemplary embodiment.

FIG. 2 illustrates a nozzle 21, 22 of a print head 103 according to an exemplary embodiment. In this embodiment, the nozzle 21, 22 includes walls 202 which, together with an actuator 220, form a reservoir or a pressure chamber 212 to receive ink. An ink droplet may be fired onto the recording medium 120 via a nozzle opening 201 of the nozzle 21, 22. The ink at the nozzle opening 201 forms what is known as a meniscus 210. Furthermore, the nozzle 21, 22 includes an actuator 220, for example a piezoelectric element, wherein the actuator 220 is configured to vary the volume of the pressure chamber 212 to receive the ink or to vary the pressure in the pressure chamber 212 of the nozzle 21, 22. In particular, as a result of a deflection 222, the volume of the pressure chamber 212 may be reduced by the actuator 220 and the pressure in the pressure chamber 212 may be increased. An ink droplet is thus ejected from the nozzle 21, 22 via the nozzle opening 201. Moreover, the volume of the pressure chamber 212 may be increased by the actuator 220, as represented by the deflection 221, in order to draw new ink into the pressure chamber 212 via an ink supply channel 230.

The different nozzles 21, 22 of a print head 103 are connected in part with one another and with an ink reservoir via one or more ink supply channels 230. Ink may be drawn into the pressure chamber 212 of a nozzle 21, 22 via the ink supply channels 230. The nozzles 21, 22 of a print head 103 may thereby indirectly mutually influence one another via the one or more ink supply channels 230. This influence, what is known as crosstalk, may lead to negative effects on the print quality of an inkjet printing system 100.

As presented above, in an exemplary embodiment, in a print head 103 at least a portion of the Q nozzles 21, 22 of said print head 103 for printing of a line of a print image are arranged parallel to one another in a nozzle row. For example, given a print head having L rows and Q nozzles 21, 22, Q/L nozzles 21, 22 of a print head 103 may be arranged in a respective row transversal to the transport direction 1. These Q/L nozzles 21, 22 may be activated simultaneously to print a line of a print image, and may mutually influence one another due to the connection via the one or more ink supply channels 230. Furthermore, nozzles 21, 22 of another row, possibly a directly adjacent row, may also be influenced.

Figure 3:
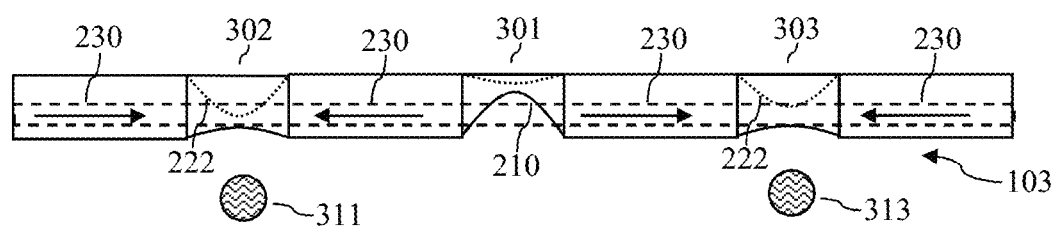
FIG. 3 illustrates control situations of a row of adjacent nozzles according to exemplary embodiments.

FIG. 3 illustrates an example in which a second nozzle 302 and a third nozzle 303 should eject an ink droplet 311, 313 simultaneously at an activation point in time, according to an exemplary embodiment. In this example, Ink is drawing from a common ink supply channel 230, as represented by the arrows in FIG. 3. A first nozzle 301 adjacent to the second and third nozzle 302, 303 should not eject an ink droplet at this activation point in time, such that the actuator 220 of the first nozzle 301 is typically not activated with a pulse. The drawing of ink by the adjacent second and third nozzle 302, 303 may lead to the situation that ink is drawn from the chamber 212 of the first nozzle 301 via the ink supply channel 230, such that a negative pressure is generated in the chamber 212 of the first nozzle 301, and the meniscus 210 at the nozzle opening 201 of the first nozzle 301 is thereby drawn inward. Due to the negative pressure in the chamber 212 of the first nozzle 301, air may be drawn into said chamber 212 of the first nozzle 301 via the nozzle opening 201, whereby the ink ejection of the first nozzle 301 may be negatively affected in the following print line or at a subsequent activation point in time. The ink ejection in one or more adjacent nozzles 302, 303 may thus negatively affect the droplet formation of the first nozzle 301. In other words, the quality of a print image may be negatively affected by crosstalk between different nozzles 21, 22, 301, 302, 303.

Nozzle failures may occur during the operation of printer 100, for example due to ink deposits. The failure of a nozzle 21, 22 typically leads to the situation that a white streak is visible on a print image, and thus the print quality is reduced. The effects of a failed nozzle 21, 22 may be compensated for at least in part by the one or more adjacent nozzles 21, 22. However, this presumes that a failed nozzle 21, 22 is detected. For this purpose, a test image may be printed repeatedly, in particular periodically, and be detected by the sensor 150. The sensor data of the sensor 150 may be evaluated in order to detect a negatively affected nozzle 21, 22. One or more measures may then be taken to compensate for the negatively affected nozzle 21, 22. A high print quality may thus be enabled even given the presence of a negatively affected nozzle 21, 22.

Figure 4A:
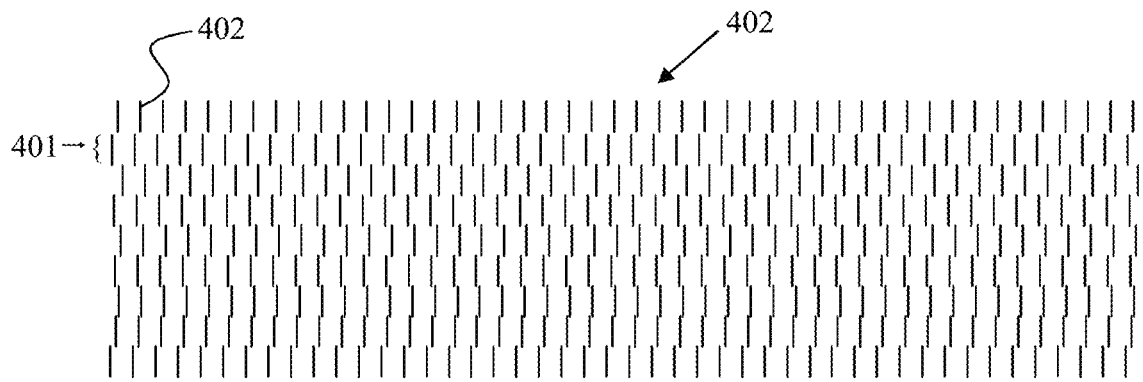
FIG. 4a is a test image according to an exemplary embodiment.
Figure 4B:
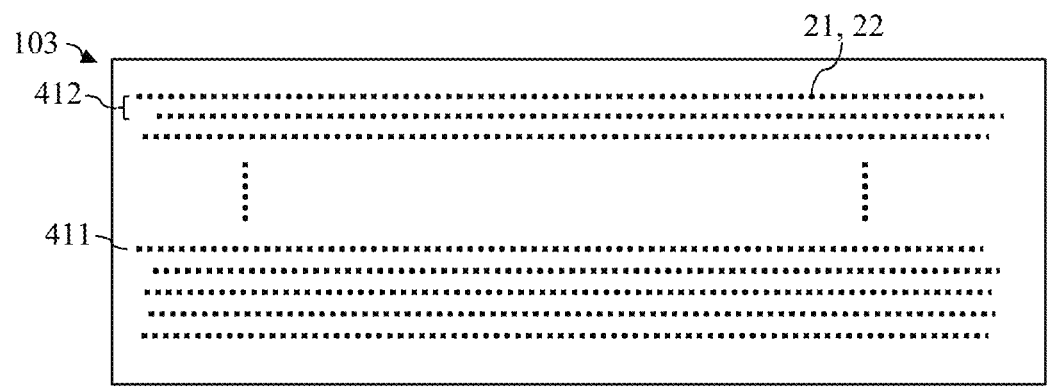
FIG. 4b is a nozzle plate of a print head according to an exemplary embodiment.

A test image may have a line pattern with, for example, L line rows for the L nozzle rows of a print head 103. FIG. 4a shows an example of a test image 400 having L=32 line rows 401 for a print head 103 having L=32 nozzle rows. Each line row 401 thereby contains OIL lines 402 that have been printed by the nozzles 21, 22 of the respective nozzle row of the print head 103. FIG. 4b shows the nozzle plate of an example of a print head 103 having L=32 nozzle rows 411 that respectively have OIL nozzles 21, 22. Different sub-groups 412 of nozzles 21, 22, in particular different sub-groups 412 of nozzle rows 411, may thereby be supplied with ink via a common supply channel 230.

To create the test image 400 from FIG. 4a, the rearmost nozzle row 411 in the printing direction or transport direction 1, for example row 32, may print a line row 401 first. The nozzle rows 31, 30, . . . , 2 through 1 may subsequently respectively print a flush line row 401. To print a line row 401, all OIL nozzles 21, 22, for example all 166 nozzles, of a nozzle row 411 may thereby print simultaneously. A line row 401 may include M=40 dots, for example. L line rows 401 for the L nozzle rows 411 are thus created on the recording medium 120, wherein the line rows 401 may directly adjoin one another.

In the example depicted in FIG. 4b, adjacent nozzle rows 411 respectively in pairs form a sub-group 412 of nozzles 21, 22 that are coupled with one another and mutually influence one another. The printing of the test image 400 that is depicted in FIG. 4a leads to the situation that, initially, all nozzles 21, 22 of a first nozzle row 411 are activated in order to print a line row 401. Directly following afterward, a directly adjacent second nozzle row 411 is activated in order to print a line row 401. The first and second nozzle row 411 may thereby belong to a common sub-group 412. Due to crosstalk via the commonly used supply channel 230, print artifacts may be created in the printing of the line row 401 of the second nozzle row 411 directly following the printing of the line row 401 of the first nozzle row 411, which print artifacts exhibit the shape of hockey sticks, for example. In particular, printing errors may occur at the beginning of the printing of the line row 401 of the second nozzle row 411. These print artifacts in particular arise in that the full operation of the first nozzle row 411 abruptly terminates just before the second nozzle row 411, which is supplied with ink via the same supply channel 230, transitions into full operation. Due to crosstalk effects, a test image 400 with print artifacts is thus printed, wherein the print artifacts negatively affect the subsequent evaluation of the test image 400, in particular for detection of a faulty nozzle 21, 22.

The printing of a test image 400 in which nozzle rows 411 that are in direct succession and that are connected with one another via a common supply channel 230 are respectively operated under full load leads to a test image 400 with print artifacts. In an exemplary embodiment, to avoid such print artifacts, a test image 400 may be printed that satisfies the following conditions:

The test image 400 respectively includes at least or precisely one line 402 with M dots for each of the Q nozzles 21, 22 of a print head 103, wherein M=30, 40, or more, for example. It may thus be ensured that each of the Q nozzles 21, 22 may be checked on the basis of the test image 400.

The individual lines 402 of the test image 400 exhibit a defined minimum pitch [clearance] A relative to one another, transversal to the transport direction 1, wherein the minimum pitch is, for example, A=10, 15, or more dots. It may thus be ensured that the individual lines 402 may be reliably differentiated from one another and be associated with the individual nozzles 21, 22.

The individual line rows 401 are printed such that, for the one or more sub-groups 412 of nozzle rows 411 that are supplied with ink via a common supply channel 230 of the print head 103, no full load operation of a nozzle row 411 of a sub-group 412 follows a full load operation of another nozzle row 411 of the same sub-group 412.

The aforementioned conditions may be satisfied by subsequent test images 400, for example.

In an exemplary embodiment, the individual line rows 401 of the test image 400 may furthermore include lines 402 for all respective OIL nozzles 21, 22 of a nozzle row 411. The order of the nozzle rows 411 is thereby modified such that nozzle rows 411 of the same sub-group 412 never directly follow one another. For example, if the pairs (32, 31), (30, 29), . . . , (2, 1) of nozzle rows 411 form respective sub-groups 412, all even nozzle rows, i.e. 32, 30, 28, . . . , 2, may thus first respectively print a line row 411, for example, before the odd nozzle rows 411, i.e. 31, 29, 27, . . . , 1, respectively print a line row 411. Via the reordering of the printing order of the line rows 401, it may be achieved that adjacent nozzle rows 401 with a common ink channel 230 are no longer activated in direct succession. Print artifacts in the test image 400 may thus be reliably avoided.

Alternatively, in an exemplary embodiment, the aforementioned conditions may be satisfied in that the number R of line rows 401 is reduced or increased, and the number T of lines 402 per line row 401 is accordingly increased or reduced, such that R*T=Q. The number R of line rows 401 is thereby preferably not a whole number divisor of the number L of nozzle rows 411 of the print head 103. In each line row 411, Q/R lines 402 may then be printed that respectively have a pitch of A=R dots from one another.

The use of R≠L leads to the situation that each line row 411 is printed by nozzles 21, 22 from a plurality of nozzle rows 411, in particular from all nozzle rows 411. Furthermore, it may be achieved that all nozzles 21, 22 do not fire simultaneously in the individual nozzle rows 411, meaning that the full load operation or full operation of the individual nozzle rows 411 may be avoided. The reduced and distributed utilization of the different nozzle rows 411 leads to a reduced fluctuation in the ink supply, which avoids an occurrence of print artifacts.

For example, R=20 line rows 401 may be printed. The respective first lines 402 of a line row 401 are printed by nozzles 21, 22 from R=20 different nozzle rows 411. The following lines 402 of the line rows 401 are then printed by the remaining 12 nozzle rows 411, and again by the first 8 nozzle rows 411 etc.

It is to be noted that the different nozzle rows 411 are typically respectively offset from one another by precisely one dot, or by precisely one line. As a result of this, it may occur that multiple line rows 401 of a test image 400 are printed simultaneously in order to print the individual lines 402 of the line rows 401 of the test image 400 without overlapping line rows 401 occurring and/or without blank lines occurring between line rows 401.

Figure 5:
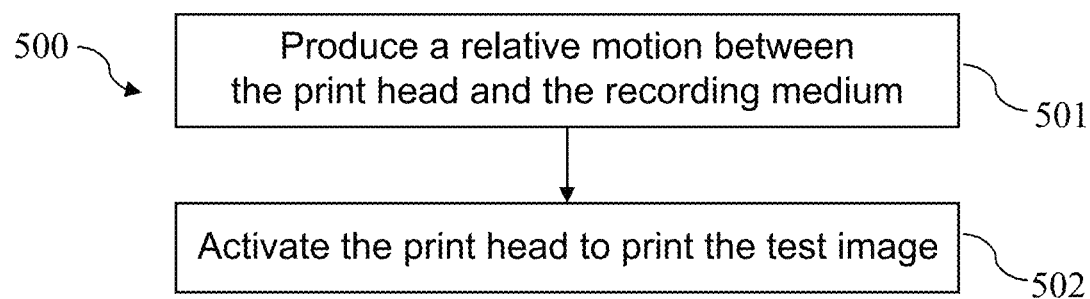
FIG. 5 is a flowchart of a method for printing to a test image according to an exemplary embodiment.

FIG. 5 shows a flowchart of a method 500 according to an exemplary embodiment for printing a test image 400 that is suitable for checking nozzles 21, 22 of a print head 103 of a printer 100. The print head 103 includes Q nozzles 21, 22 that are arranged in L different nozzle rows 411, with L>2 and with Q>5. Q>1000 is typical, for example Q=5312. Furthermore, L>10 is typical, for example L=32.

In an exemplary embodiment, the nozzles 21, 22 of the print head 103 may be supplied with ink at least in part via common internal supply channels 230. In particular, the nozzles 21, 22 of at least one sub-group 412 of two or more nozzle rows 411 may be supplied with ink via a common supply channel 230 of the print head 103. For example, the L nozzle rows 411 may belong in pairs to L/2 different sub-groups 412, wherein the nozzles 21, 22 of each sub-group 412 are connected with one another by a common supply channel 230. The connection of the nozzles 21, 22 of a sub-group 412 via a common, internal supply channel 230 may lead to crosstalk effects.

In an exemplary embodiment, the method 500 includes the production 501 of a relative motion along a transport direction 1 between the print head 103 and a recording medium 120. in particular, the recording medium 120 may be directed along the transport direction 1 past a stationary print head 103 in order to produce the relative motion. During a printing process, the recording medium 120 is thereby typically moved only in the transport direction 1, and not in an opposite reverse direction. In other words: the relative motion between print head 103 and recording medium 120 may be exclusively limited to the transport direction 1 during a printing process. By maintaining a uniform transport direction 1, relatively high print speeds may be achieved, for example of 2 m/s or more.

In an exemplary embodiment, the nozzles 21, 22 in directly adjacent nozzle rows 411 of the print head 103 may be separated from one another by precisely one line width traveling in the transport direction 1. The nozzle rows 411 thereby typically travel transversal to the transport direction 1. The print head 103 may thus be designed such that dots in L different lines of a test image 400 may be printed via a simultaneous ink ejection from nozzles 21, 22 in the L different nozzle rows 411. Furthermore, the print head 103 may be designed such that OIL dots in a line of a test image 400 may be printed via a simultaneous ink ejection from OIL nozzles 21, 22 in a nozzle row 411.

In an exemplary embodiment, the method 500 also includes the activation 502 of the nozzles 21, 22 of the print head 103 in order to print a test image 400 onto the recording medium 120 during the relative motion. The nozzles 21, 22 may thereby be activated such that the test image 400 includes R line rows 401 with respectively two or more lines 402, with R>1. In particular, each line row 401 may include precisely Q/R or more lines 402. The number R of lines 402 is typically R>5, in particular R>15. The individual line rows 401 respectively travel transversal to the transport direction 1. In other words: the individual lines 402 of a line row 401 are arranged next to one another in relation to the transport direction 1.

In an exemplary embodiment, the individual lines 402 respectively travel along the transport direction 1. Furthermore, in an exemplary embodiment, each line 402 is printed by precisely one nozzle 21, 22. The print head 103 may be designed such that each of the Q nozzles 21, 22 of the print head 103 is associated with precisely one column 31, 32 traveling along the transport direction 1. Precisely Q lines 402 in precisely Q different columns 31, 32 may thus be printed by the Q nozzles 21, 22 onto a recording medium 120, wherein the individual columns 31, 32 are offset relative to one another transversal to the transport direction 1. The test image 400 may then include at least or precisely Q lines 402 for the Q nozzles 21, 22 in order to make it possible to check every single nozzle 21, 22 of the print head 103.

In an exemplary embodiment, the individual lines 402 may respectively include M dots, with M>1. M>10 is typical, in particular M>30. In other words: the individual lines 402 may extend across M respective lines, wherein the individual lines travel transversal to the columns 31, 32. The print quality of the nozzle 21, 22 associated with the respective line 402 may be reliably checked via the use of lines 402 having a plurality of dots, in particular with M=10, 20, 30, or more dots. In particular, a negatively affected nozzle 21, 22 may thus be reliably detected via image analysis of the line pattern of a test image 400.

The nozzles 21, 22 of the print head 103 may be activated such that two directly adjacent line rows 401 are not printed in direct succession by all respective nozzles 21, 22 of two nozzle rows 411 of a common sub-group 412 of nozzle rows 411. In other words: the test image 400 may be printed such that the full operation of a nozzle row 411 of a sub-group 412 does not directly follow the full operation of a further nozzle row 411 of the same sub-group 412. Given the full operation of a nozzle row 411, all nozzles 21, 22 of said nozzle row 411 are thereby activated simultaneously, meaning during the same line clock cycle, in order to print lines 402 of a line row 401.

Within the scope of the method 500, a test image 400 is thus printed with a plurality of line rows 401, wherein the individual lines 402 of the line rows 401 are printed at least in part by different nozzles 21, 22 of a print head 103. The lines 402 are thereby associated with the different line rows 401 such that the lines 402 of two directly adjacent line rows 401 are not printed by all respective nozzles 21, 22 from two nozzle rows 411 of the print head 103 that are connected with one another via a common ink supply channel 230. Crosstalk effects between the nozzle rows 411, and print image artifacts of the test image 400 that are linked therewith, may thus be avoided. This in turn enables a reliable detection of nozzle errors on the basis of the printed test image 400.

As has already been presented above, the individual nozzle rows 411 respectively include, at least on average, Q/L nozzles 21, 22. The nozzles 21, 22 of the print head 103 may then be activated such that the test image 400 includes R=L line rows 401 with, at least on average, Q/L lines 402. The Q/L lines 402 of a line row 401 may thereby be printed by Q/L nozzles 21, 22 of a nozzle row 411. A unique association, in particular a one-to-one association, between the nozzle rows 411 and the line rows 401 may thus be produced, which enables an efficient evaluation of the test image 400.

Furthermore, the nozzles 21, 22 of the print head 103 may be activated such that two directly adjacent line rows 401 are not printed in direct succession by the nozzles 21, 22, in particular by respectively all nozzles 21, 22 of two nozzle rows 411 of the same sub-group 412. Crosstalk, and print image artifacts that are linked therewith, may thus be reliably avoided.

It may be assumed that the L nozzle rows 411 of the print head 103 are identified by the numerical identifiers I=1 through L. Furthermore, it may be assumed that pairs of nozzle rows 411 with respective identifiers in direct succession respectively form different sub-groups 412. For example, the pairs of nozzle rows 411 with the identifiers 1, 2 or 3, 4 etc. through L−1, L may respectively form a sub-group 412 of nozzle rows 411.

The nozzles 21, 22 of the print head 103 may then be activated such that, initially, all nozzle rows 411 having even identifiers respectively print a line row 401, and subsequently all nozzle rows 411 having odd identifiers respectively print a line row 401. Alternatively, the nozzles 21, 22 of the print head 103 may be activated such that, initially, all nozzle rows 411 having odd identifiers respectively print a line row 401, and subsequently all nozzle rows 411 having even identifiers respectively print a line row 401. It may thus be reliably avoided that nozzle rows 411 of a sub-group 412 are operated in full operation in direct succession. In other words, print image artifacts may thus be reliably avoided.

In an exemplary embodiment, the nozzles 21, 22 of the print head 103 may be activated such that, for I=L through I=3, in steps of two respective nozzle rows 411, the nozzle row 411 having the identifier I prints one line row 401, then the nozzle row 411 having the identifier I−2 prints one line row 401, and then the nozzle row 411 having the identifier I−1 prints one line row 401. Alternatively, the nozzles 21, 22 of the print head 103 may be activated in reverse order such that, for I=1 through I=L−2, in steps of two respective nozzle rows 411, the nozzle row 411 having the identifier I+2 then prints one line row 401, and then the nozzle row 411 having the identifier I+1 then prints one line row 401. The printing of an artifact-free test image 400 may be accelerated via such an ordering of nozzle rows 411.

As presented above, the full operation of nozzle rows 411 of a common sub-group 402 in direct succession may be reliably avoided via a suitable order of the printing of R=L line rows 401 by means of the L nozzle rows 411. Alternatively, the nozzles 21, 22 of the print head 103 may be activated such that the test image 400 includes R line rows 401 having respectively Q/R lines 402, wherein R<L. R is thereby preferably not a whole-number divisor of L. R is typically greater than 5, 10, or 15. The nozzles 21, 22 of the print head 103 may then be activated such that the Q/R lines 402 of a line row 401 are printed by Q/R nozzles 21, 22 from multiple different nozzle rows 411, in particular from R or from L different nozzle rows 411. The full operation of nozzle rows 411 of a common sub-group 402 in direct succession may thus likewise be reliably avoided. Furthermore, the size of the test image 400, and the spoilage linked therewith, may thus be reduced.

It may be assumed that the Q nozzles 21, 22 are identified by numerical identifiers q=1 through Q. Furthermore, it may be assumed that the nozzles 21, 22 having the identifiers q=I+(I−1)*R, for I=1, . . . , Q/R, are part of a single nozzle row 411 having the identifier I. The print head 103 may thereby be designed such that the dots in the column 31, 32 having the identifier q are printed by the nozzle 21, 22 having the identifier q. The column q=1 may be arranged on one side of the recording medium 120, and the column q=Q may be arranged on the opposite, other side of the recording medium 120. In other words: the columns q=1 through Q may correspond to the dots of a line transversal to the transport direction 1.

In an exemplary embodiment, the nozzles 21, 22 of the print head 103 may be activated such that the Q/R lines 401 of a line row 401 having an identifier r, with r=1, . . . , R, are printed by the nozzles 21, 22 having the identifiers r+(I−1) *R, I=1, . . . , Q/R. Print image artifacts of the test image 400 may thus be reliably avoided. Furthermore, relatively large pitches A between the lines 402 of a line row 401 may thus be produced, which enables a reliable evaluation of a test image 400.

Moreover, in an exemplary embodiment, the method 500 may include the detection of sensor data in relation to the test image 400. The sensor data may, for example, be detected by a sensor 150, for example by an image camera or by a line scanner. A negatively affected nozzle 21, 22 of the print head 103 may then be detected on the basis of the sensor data. In particular, a check may thereby be made as to whether the test image 400 has a missing or incomplete and/or negatively affected line 402. The missing, incomplete and/or negatively affected line 402 indicates that the nozzle 21, 22 associated therewith has been negatively affected. In reaction to the detection of a negatively affected nozzle 21, 22, one or more measures may be implemented to compensate for said negatively affected nozzle 21, 22. The print quality of a printer 100 may thus be increased.

Furthermore, in this document a controller 101 is described for an inkjet printer 100, wherein the printer 100 includes at least one print head 103 having Q nozzles 21, 22 that are arranged in L different nozzle rows 411, with L>2 and with Q>5. The nozzles 21, 22 of at least one sub-group 412 of two or more nozzle rows 411 are supplied with ink via a common, internal supply channel 230 of the print head 103.

In an exemplary embodiment, the controller 101 is configured to produce a relative motion along a transport direction 1 between the print head 103 and a recording medium 120. Furthermore, the controller 101 can be configured to activate the nozzles 21, 22 of the print head 103 in order to print a test image 400 onto the recording medium 120 during the relative motion. The nozzles 21, 22 may thereby be activated such that the test image 400 includes R line rows 401 having respectively two or more lines 402, with R>1, and such that the test image 400 includes at least or precisely Q lines 402 for the Q nozzles 21, 22. Furthermore, the nozzles 21, 22 may be activated such that two directly adjacent line rows 401 are not printed in immediate succession by all respective nozzles 21, 22 of two nozzle rows 411 of the same sub-group 412 of nozzle rows 411. A direct transition from a full operation of a first nozzle row 411 to a full operation of a second nozzle row 411 of a common sub-group 412 of nozzle rows 411 may thus be avoided in order to print an artifact-free test image 400 in the event that no nozzle 21, 22 of the print head 103 is negatively affected.

In an exemplary embodiment, an inkjet printer 100 is described that includes the controller 101 according to one or more aspects described herein.

In an exemplary embodiment, a test image 400 for checking nozzles 21, 22 of a print head 103 is described. The print head 103 includes Q nozzles 21, 22 that are arranged in L different nozzle rows 411, with L>2 and with Q>5. The Q nozzles 21, 22 may be configured to print dots in corresponding Q columns 31, 32 of the test image 400 in a one-to-one relation.

The test image 400 includes R line rows 401 having respectively two or more lines 402, with R>1. The individual lines thereby travel within a column 31, 32 and have been printed by precisely one nozzle 21, 22. Moreover, the test image 400 includes at least or precisely Q lines 402 for the Q nozzles 21, 22 of the print head 103. The test image 400 may, if applicable, include exclusively R line rows 401 having at least or precisely Q lines 402.

The Q lines 402 may be arranged in the R line rows 401 such that a first line row 401 of the test image 400 does not include lines 402 for all nozzles 21, 22 of a first nozzle row 411, and such that a directly adjacent second line row 401 of the test image 400 does not include lines 402 for all nozzles 21, 22 of a second nozzle row 411, if the first and second nozzle row 411 are connected with one another via a common internal supply channel 230 of the print head 103.

Advantageously, artifacts in the printing of a test image 400 having a plurality of line rows 401 may be avoided. Test images 400 may thus be provided with which negative effects on individual nozzles 21, 22 may be advantageously detected in a precise and reliably manner.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 transport direction (of the recording medium)
21, 22 nozzle
31, 32 column (of the print image)
100 printer
101 controller
102 print bar
103 (usable) print head
120 recording medium
140 print group
150 sensor
201 nozzle opening
202 wall
210 meniscus
212 chamber
220 actuator (piezoelectric element)
221, 222 deflection of the actuator
230 ink supply channel
301-303 nozzle
311, 313 ink droplet
400 test image
401 line row
402 line
411 nozzle row 412 sub-group of nozzle rows
500 method for printing a test image
501-502 method steps

The invention claimed is:

1. A method for printing a test image to check nozzles of a print head that includes Q nozzles that are arranged in L different nozzle rows, with L>2 and with Q>5, the nozzles of at least one sub-group of two or more nozzle rows being supplied with ink via a common supply channel of the print head, the method comprising:
producing a relative motion along a transport direction between the print head and a recording medium; and
activating the nozzles of the print head to print a test image onto the recording medium during the relative motion, wherein:
the test image includes R line rows having respectively two or more lines, where R>1, wherein a line of the two or more lines travels along the transport direction and is printed by precisely one nozzle of the Q nozzles, the line includes M dots, where M>1, and wherein a line row of the R line rows travels transversal to the transport direction;
the test image includes at least Q lines corresponding to the Q nozzles; and
two directly adjacent line rows of the R line rows are not printed in direct succession by all respective nozzles of two nozzle rows of the at least one sub-group of the two or more nozzle rows.

2. The method according to claim 1, wherein:
a nozzle row comprises Q/L nozzles; and
the nozzles of the print head are activated such that:
the test image comprises R=L line rows having respectively Q/L lines; and
the Q/L lines of a line row are printed by the Q/L nozzles of a nozzle row.

3. A method according to claim 2, wherein:
the L nozzle rows belong in pairs to L/2 different sub-groups; and
the nozzles of the print head are activated such that two directly adjacent line rows are not printed in succession by the nozzles of two nozzle rows of a same sub-group of the L/2 different sub-groups.

4. The method according to claim 3, wherein, where the L nozzle rows are identified by identifiers 1 through L, and where pairs of the nozzle rows having respective identifiers in immediate succession form respective sub-groups, the nozzles of the print head are activated such that:
initially, all nozzle rows having even identifiers respectively print one line row, and subsequently all nozzle rows having odd identifiers respectively print one line row; or
initially, all nozzle rows having odd identifiers respectively print one line row, and subsequently all nozzle rows having even identifiers respectively print one line row.

5. The method according to claim 3, wherein, where the L nozzle rows are identified by identifiers 1 through L, and where pairs of the nozzle rows having respective identifiers in immediate succession form respective sub-groups, the nozzles of the print head are activated such that:
for I=L through I=3, in steps of two respective nozzle rows, the nozzle row having the identifier I prints one line row, then the nozzle row having the identifier I-2 prints one line row, and then the nozzle row having the identifier I-1 prints one line row; or
for I=1 through I=L-2, in steps of two respective nozzle rows, the nozzle row having the identifier I prints one line row, then the nozzle row having the identifier I+2 prints one line row, and then the nozzle row having the identifier I+1 prints one line row.

6. The method according to claim 1, wherein:
a nozzle row comprises Q/L nozzles; and
the nozzles of the print head are activated such that:
the test image comprises R line rows having respectively Q/R lines, where R<L, and where R is not a whole number divisor of L; and
the Q/R lines of a line row are printed by Q/R nozzles from a plurality of different nozzle rows.

7. The Method according to claim 6, wherein, where the Q nozzles are identified by identifiers 1 through Q, and where the nozzles having the identifiers I+(I−1)*R, for I=1 to Q/R are part of a print row having the identifier I, the nozzles of the print head are activated such that the Q/R lines of a line row having an identifier r, with r=1 to R, are printed by the nozzles having the identifiers r+(I−1)*R, I=1, Q/R.

8. The method according to claim 1, wherein:
the nozzles in directly adjacent nozzle rows are spaced apart from one another by precisely one line width traveling in the transport direction;
the nozzle rows travel transversal to the transport direction; and
the recording medium is moved along the transport direction past a stationary print head to produce the relative motion.

9. The method according to claim 1, wherein Q>1000; L>10; R>5; or M>10.

10. The method according to claim 1, wherein Q>1000; L>10; R>5; and M>10.

11. The method according to claim 1, wherein Q=5312; L=32; R>15; and M>30.

12. A non-transitory computer-readable storage medium with an executable program stored thereon, that when executed, instructs a processor to perform the method of claim 1.

13. A controller for an inkjet printer that comprises at least one print head having Q nozzles that are arranged in L different nozzle rows, with L>2 and with Q>5, the nozzles of at least one sub-group of two or more nozzle rows being supplied with ink via a common, internal supply channel of the at least one print head, the controller being configured to:
produce a relative motion along a transport direction between the at least one print head and a recording medium; and
activate the nozzles of the print head to print a test image onto the recording medium during the relative motion, wherein:
the test image includes R line rows having respectively two or more lines, with R>1, wherein a line travels along the transport direction and is printed by precisely one nozzle, the line including M dots, with M>1, and wherein a line row travels transversal to the transport direction;
the test image includes at least Q lines for the Q nozzles; and
two directly adjacent line rows are not printed in direct succession by all respective nozzles of two nozzle rows of the sub-group of nozzle rows.

14. A printer comprising:
at least one print head having Q nozzles that are arranged in L different nozzle rows, with L>2 and with Q>5; and
the controller of claim 13.

15. The printer according to claim 14, further comprising an internal supply channel configured to supply the nozzles of at least one sub-group of two or more nozzle rows with ink.

16. A test image for checking nozzles of a print head having Q nozzles that are arranged in L different nozzle rows, with L>2 and with Q>5, the Q nozzles being configured to print dots in corresponding Q columns of the test image in a one-to-one-relation, the test image comprising:
- R line rows having respectively two or more lines, with R>1, a line traveling within a column and having been printed by precisely one nozzle, wherein the line including M dots, with M>1; wherein a line row travels transversal to the column; and
- at least Q lines for the Q nozzles, which are arranged in the R line rows such that a first line row of the test image does not comprise lines for all nozzles of a first nozzle row, and a directly adjacent second line row of the test image does not comprise lines for all nozzles of a second nozzle row that are connected with one another via a common internal supply channel of the print head.

* * * * *